United States Patent [19]

Atsatt et al.

[11] Patent Number: 5,745,793
[45] Date of Patent: Apr. 28, 1998

[54] APPARATUS HAVING A CIRCULAR BUFFER THAT MAINTAINS A ONE ENTRY GAP BETWEEN ELEMENTS WRITTEN TO THE MICROPROCESSOR AND ELEMENTS OPERATED ON BY THE CLOCK

[75] Inventors: Sean R. Atsatt, Santa Cruz; John M. Wright, Campbell, both of Calif.

[73] Assignee: Seagate Technology, Inc., Scotts Valley, Calif.

[21] Appl. No.: 485,965

[22] Filed: Jun. 7, 1995

[51] Int. Cl.$^6$ .................................................. G06F 13/00
[52] U.S. Cl. ................. 395/881; 395/551; 395/559; 395/825; 395/872
[58] Field of Search ............... 327/277; 395/250, 395/442, 600, 800, 551, 559, 825, 872, 881

[56] References Cited

U.S. PATENT DOCUMENTS

| | | | |
|---|---|---|---|
| 3,699,535 | 10/1972 | Klein | 395/800 |
| 4,430,727 | 2/1984 | Moore et al. | 395/442 |
| 4,468,624 | 8/1984 | Rehbein et al. | 327/277 |
| 4,527,233 | 7/1985 | Ambrosius, III et al. | 395/250 |
| 5,544,356 | 8/1996 | Robinson et al. | 395/600 |

*Primary Examiner*—Thomas C. Lee
*Assistant Examiner*—Po C. Huang
*Attorney, Agent, or Firm*—LaRiviere, Grubman & Payne

[57] ABSTRACT

Bandwidth optimization between a microprocessor and a disc drive controller. Method and apparatus are disclosed for synchronizing asynchronous microprocessor writes to synchronous read/write channel operation. In this synchronization, bandwidth of the microprocessor is equal to or greater than the bandwidth of the disc controller. Both no ready line and ready line implementations are described.

1 Claim, 20 Drawing Sheets

| Buffer Depth for Sync Delay | No Resync | | | Resync | | |
|---|---|---|---|---|---|---|
| | 16 Mbits/s 500ns | 32 Mbits/s 250ns | 36 Mbits/s 222ns | 16 Mbits/s 500ns | 32 Mbits/s 250ns | 36 Mbits/s 222ns |
| | 5 | 3 | 2 | 7 | 4 | 3 |
| | 3 | 2 | 1 | 5 | 2 | 2 |
| | 6 | 3 | 3 | 9 | 4 | 4 |
| | 4 | 2 | 2 | 6 | 3 | 3 |
| | 3 | 2 | 1 | 4 | 2 | 2 |
| | 8 | 4 | 3 | 11 | 5 | 5 |
| | 5 | 3 | 2 | 7 | 4 | 3 |
| | 4 | 2 | 2 | 5 | 3 | 2 |
| | 3 | 2 | 1 | 4 | 2 | 2 |
| | 10 | 5 | 5 | 14 | 7 | 6 |
| | 7 | 3 | 3 | 10 | 5 | 4 |
| | 5 | 3 | 2 | 7 | 4 | 3 |
| | 4 | 2 | 2 | 6 | 3 | 3 |
| | 1 | 1 | 1 | 1 | 1 | 1 |
| | 1 | 1 | 1 | 2 | 1 | 1 |
| | 2 | 1 | 1 | 2 | 1 | 1 |

FIG. 7F

| FIG. 7A | FIG. 7B | FIG. 7C |
|---|---|---|
| FIG. 7D | FIG. 7E | FIG. 7F |

FIG. 7

FIG. 7A  Microprocessor Write Synchronization (Ready Line Not Used)

| Processor | F | | Watts | # Clks Per Cycle | Bus Cycle Time | --Write Timing-- | | --Read Timing-- | |
|---|---|---|---|---|---|---|---|---|---|
| | | | | | | Addr>Write | Write Low | Addr>Read | Read>Data |
| 80C196 | 16Mhz | 63ns | 0 | 4 | 250ns | 100ns | 63ns | 80ns | 63ns |
| | 16Mhz | 63ns | 1 | 6 | 375ns | 100ns | 188ns | 80ns | 188ns |
| | 20Mhz | 50ns | 0 | 4 | 200ns | 75ns | 50ns | 55ns | 50ns |
| | 20Mhz | 50ns | 1 | 6 | 300ns | 75ns | 150ns | 55ns | 150ns |
| | 20Mhz | 50ns | 2 | 8 | 400ns | 75ns | 250ns | 55ns | 250ns |
| | 24Mhz | 42ns | 0 | 4 | 167ns | 58ns | 42ns | 38ns | 42ns |
| | 24Mhz | 42ns | 1 | 6 | 250ns | 58ns | 125ns | 38ns | 125ns |
| | 24Mhz | 42ns | 2 | 8 | 333ns | 58ns | 208ns | 38ns | 208ns |
| | 24Mhz | 42ns | 3 | 10 | 417ns | 58ns | 292ns | 38ns | 292ns |
| | 33Mhz | 30ns | 0 | 4 | 121ns | 36ns | 30ns | 16ns | 30ns |
| | 33Mhz | 30ns | 1 | 6 | 182ns | 36ns | 91ns | 16ns | 91ns |
| | 33Mhz | 30ns | 2 | 8 | 242ns | 36ns | 152ns | 16ns | 152ns |
| | 33Mhz | 30ns | 3 | 10 | 303ns | 36ns | 212ns | 16ns | 212ns |
| 80C52 | 16Mhz | 63ns | NA | 12 | 750ns | 120ns | 275ns | 120ns | 148ns |
| | 20Mhz | 50ns | NA | 12 | 600ns | 110ns | 200ns | 110ns | 155ns |
| | 24Mhz | 42ns | NA | 12 | 500ns | 77ns | 150ns | 77ns | 118ns |
| | 33Mhz | 30ns | NA | 12 | 364ns | 31ns | 82ns | 31ns | 62ns |
| | | | | | | | Min Latency (empty buffer)* | | |
| | | | | | | | Max Latency (empty buffer)* | | |
| | | | | | | | Max Latency (full buffer)* | | |

FIG. 7B

| Buffer Depth | Without a Byte Clock Re-Sync occuring | | | | Max Write Ratio with full buffer | | | |
|---|---|---|---|---|---|---|---|---|
| | Max B to B Write empty buffer | | | | Given Min Disk data rate | | | |
| | 5 | | | | | | | |
| | 16 Mblts/s | 32 Mblts/s | 36 Mblts/s | | 16 Mblts/s | 32 Mblts/s | 36 Mblts/s | |
| | 500ns | 250ns | 222ns | | 500ns | 250ns | 222ns | |
| 6.0 | No Limit | No Limit | | 0.50 | No Limit | No Limit | |
| 7.0 | No Limit | No Limit | | 0.75 | No Limit | No Limit | |
| 5.0 | 7.0 | 8.0 | | 0.40 | 0.80 | 0.90 | |
| 6.0 | No Limit | No Limit | | 0.60 | No Limit | No Limit | |
| 7.0 | No Limit | No Limit | | 0.80 | No Limit | No Limit | |
| 5.0 | 6.0 | 7.0 | | 0.33 | 0.67 | 0.75 | |
| 6.0 | No Limit | No Limit | | 0.50 | No Limit | No Limit | |
| 7.0 | No Limit | No Limit | | 0.67 | No Limit | No Limit | |
| 7.0 | No Limit | No Limit | | 0.83 | No Limit | No Limit | |
| 5.0 | 5.0 | 6.0 | | 0.24 | 0.48 | 0.55 | |
| 5.0 | 7.0 | 7.0 | | 0.36 | 0.73 | 0.82 | |
| 5.0 | 8.0 | No Limit | | 0.48 | 0.97 | No Limit | |
| 6.0 | No Limit | No Limit | | 0.61 | No Limit | No Limit | |
| No Limit | No Limit | No Limit | | No Limit | No Limit | No Limit | |
| No Limit | No Limit | No Limit | | No Limit | No Limit | No Limit | |
| No Limit | No Limit | No Limit | | No Limit | No Limit | No Limit | |
| 750ns | 375ns | 333ns | | | | | |
| 1250ns | 625ns | 556ns | | | | | |
| 2500ns | 1250ns | 1111ns | | | | | |

FIG. 7C

| Buffer Depth | When a Byte Clock Re-Sync occurs — Max B to B Write empty buffer | | | Max Write Ratio with full buffer — Given Min Disk data rate | | |
|---|---|---|---|---|---|---|
| | 16 Mblts/s | 32 Mblts/s | 36 Mblts/s | 16 Mblts/s | 32 Mblts/s | 36 Mblts/s |
| 5 | 500ns | 250ns | 222ns | 0.42 | 0.83 | 0.94 |
| | 5.0 | No Limit | No Limit | 0.63 | No Limit | No Limit |
| | 6.0 | 6.0 | 7.0 | 0.33 | 0.67 | 0.75 |
| | 5.0 | No Limit | No Limit | 0.50 | No Limit | No Limit |
| | 6.0 | No Limit | No Limit | 0.67 | No Limit | No Limit |
| | 5.0 | 5.0 | 6.0 | 0.28 | 0.56 | 0.63 |
| | 5.0 | 7.0 | 8.0 | 0.42 | 0.83 | 0.94 |
| | 6.0 | No Limit | No Limit | 0.56 | No Limit | No Limit |
| | 5.0 | No Limit | No Limit | 0.69 | No Limit | No Limit |
| | 5.0 | 5.0 | 5.0 | 0.20 | 0.40 | 0.45 |
| | 5.0 | 6.0 | 6.0 | 0.30 | 0.61 | 0.68 |
| | 5.0 | 7.0 | 7.0 | 0.40 | 0.81 | 0.91 |
| | No Limit | No Limit | No Limit | 0.51 | No Limit | No Limit |
| | No Limit | No Limit | No Limit | No Limit | No Limit | No Limit |
| | No Limit | No Limit | No Limit | No Limit | No Limit | No Limit |
| | 750ns | 375ns | 333ns | No Limit | No Limit | No Limit |
| | 1750ns | 875ns | 778ns | No Limit | No Limit | No Limit |
| | 3000ns | 1500ns | 1333ns | No Limit | No Limit | No Limit |

*Resync spread over buffer depth

*8052 Calculations assume that you must fetch an instruction between each write

| Processor | F | Watts |
|---|---|---|
| 80C196 | 16Mhz | 0 |
| | 16Mhz | 1 |
| | 20Mhz | 0 |
| | 20Mhz | 1 |
| | 20Mhz | 2 |
| | 24Mhz | 0 |
| | 24Mhz | 1 |
| | 24Mhz | 2 |
| | 24Mhz | 3 |
| | 33Mhz | 0 |
| | 33Mhz | 1 |
| | 33Mhz | 2 |
| | 33Mhz | 3 |
| 80C52 | 16Mhz | NA |
| | 20Mhz | NA |
| | 24Mhz | NA |
| | 33Mhz | NA |

Approximate Gate Count = 804

FIG. 7D

| | No Resync | | | Resync | | |
|---|---|---|---|---|---|---|
| | Max Buffer can be filled | | | Max Buffer can be filled | | |
| | 16 Mblts/s 500ns | 32 Mblts/s 250ns | 36 Mblts/s 222ns | 16 Mblts/s 500ns | 32 Mblts/s 250ns | 36 Mblts/s 222ns |
| | Overflow | 2 | 1 | Overflow | 3 | 2 |
| | Overflow | 1 | 0 | Overflow | 1 | 1 |
| | Overflow | Overflow | Overflow | Overflow | Overflow | Overflow |
| | Overflow | 1 | 1 | Overflow | 2 | 2 |
| | Overflow | 1 | 0 | Overflow | 1 | 1 |
| | Overflow | 2 | Overflow | Overflow | Overflow | Overflow |
| | Overflow | 1 | 1 | Overflow | 3 | 2 |
| | Overflow | 1 | 0 | Overflow | 2 | 1 |
| | Overflow | Overflow | Overflow | Overflow | 1 | 1 |
| | Overflow | Overflow | 1 | Overflow | Overflow | Overflow |
| | Overflow | Overflow | 1 | Overflow | Overflow | Overflow |
| | Overflow | 1 | 1 | 1 | 2 | 2 |
| | 1 | 1 | 1 | 2 | 1 | 1 |
| | 1 | 1 | 1 | 2 | 1 | 1 |
| | 2 | 1 | 1 | | 1 | 1 |

FIG. 7E

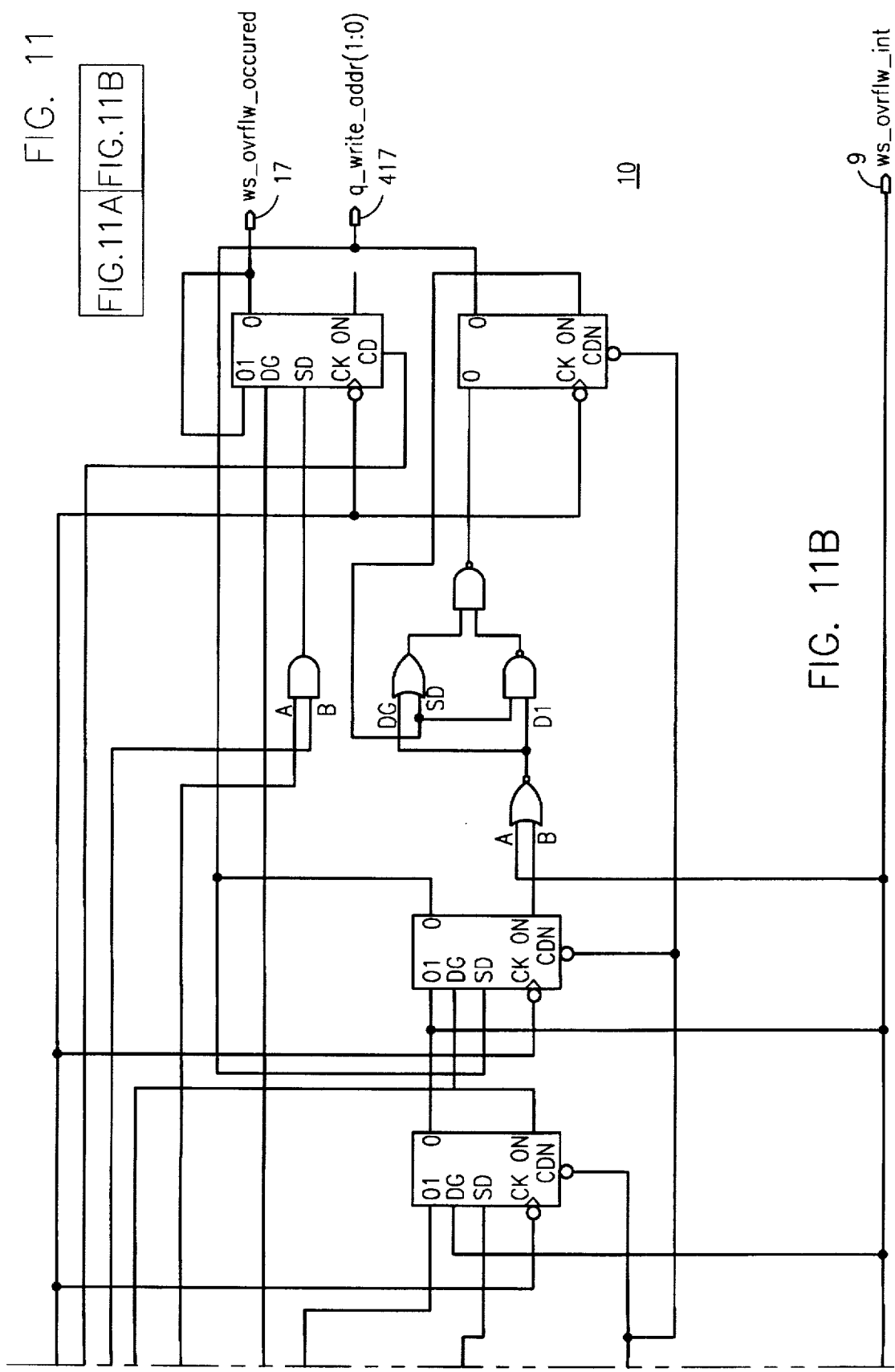

APPARATUS HAVING A CIRCULAR BUFFER THAT MAINTAINS A ONE ENTRY GAP BETWEEN ELEMENTS WRITTEN TO THE MICROPROCESSOR AND ELEMENTS OPERATED ON BY THE CLOCK

TECHNICAL FIELD

The invention relates to bandwidth optimization between a microprocessor and a disc drive controller. In particular, the present invention relates to method and apparatus for a bandwidth optimizing interface between asynchronous microprocessor writes and synchronous hard disc drive control transfer.

BACKGROUND ART

A microprocessor performs write operations to configure and control a disc controller. Such writes are asynchronous. This asynchronous character makes synthesis of logic circuits which must operate off of a different synchronous clock using computer aided engineering software more problematic. Moreover, this synchronous clock is often slow relative to the bandwidth of the microprocessor, and thus the microprocessor bandwidth may be severely reduced to accommodate writes to the disc drive. In other words, the microprocessor employed for disc drive writes must be slowed down such that its bandwidth is less than or equal to that of the disc controller, when the microprocessor is operating with the disc controller.

Therefore, it would be desirable to provide bandwidth optimization, where the bandwidth of a microprocessor would not be so severely limited when transferring microprocessor writes to the disc controller. Furthermore, it would be desirable if such bandwidth optimization could be modelled and synthesized using synchronous transfer of microprocessor writes to formatter registers, while accommodating asynchronous microprocessor writes, to facilitate circuit synthesis with computer aided engineering software.

DISCLOSURE OF INVENTION

The present invention provides a circuit for bandwidth matching between fast microprocessor writes to a disc drive controller operating off a relatively slow speed clock (byte_clk) signal, where the byte_clk signal is synchronous to reads from a disc drive disk media. When required, the byte_clk signal may be re-synchronized during writes to a formatter. The present invention accommodates byte_clk re-synchronization by "stretching" a current microprocessor write into the next cycle of a formatter register.

A circular write buffer is provided both for bandwidth matching and to accommodate synchronization latency. All storage elements of the write buffer (queues) written to are clocked off of the asynchronous microprocessor write strobe signal. All microprocessor writes to formatter registers are synchronized to the byte_clock signal. All transfers out of storage elements of the write buffer are clocked off the byte_clock signal.

If the microprocessor has no ready line capability, a maskable interrupt is selected just before a buffer overflow can occur (i.e., overflow imminent interrupt). When a buffer overflow has occurred, a status bit is set to indicate the overflow condition. The interrupt is selected by setting a configuration register bit. The interrupt will occur when there is only one location in the buffer available to accommodate a microprocessor write. If the interrupt is set and a subsequent microprocessor write to the write buffer takes place, then a status bit is set to indicate that an overflow has occurred. Said status bit is set when there are no locations in the write buffer available to accommodate microprocessor writes. To avoid setting the status bit, the overflow imminent interrupt bit must be cleared prior to the next microprocessor write to the disc controller. If the interrupt bit is set, the system may check to see if the status bit is also set. If the status bit is not set, then the last write was successful.

If the microprocessor has ready line capability, a ready signal is provided to the microprocessor for system level timing optimization. When the ready line is used, a ready signal may be pulled low to indicate a not ready condition. Microprocessor waits states may be inserted into a current microprocessor write cycle to prevent an overflow from occurring. Thus, the ready signal may be used to ensure that no overflow occurs by "throttling back" the microprocessor with the insertion of wait states. Alternatively, the ready signal may be used to force completion of the previous operation (write) before the next operation (write) to the buffer takes place (i.e., forcing in order operation). In which case, a write in progress signal is used to control the ready line signal to ensure in order operation. As a fail safe for microprocessors which are not behaving according to specification, both the maskable interrupt bit and the status bit indicating an overflow has occurred may be set off the ready line if the microprocessor completes a write when ready is false.

Notably, if the ready line is not used, then a fast microprocessor performing multiple back-to-back writes may cause a buffer overflow. Consequently, if there is no ready line capability, then speed limitations must be imposed on the microprocessor. However, if an overflow occurs, the overflow status bit is set, and the microprocessor write causing the overflow is blocked from taking place.

The circuit of the present invention provides a write decode signal for each formatter register in its write domain. If the write decode signal is true, the associated register clocks the provided data into itself on the falling edge of the byte_clk signal. The data to be captured is available at least one byte time before the falling edge of the byte_clk signal. Moreover, the write decode signal is available at least two bit times before this falling edge (i.e., the set up time).

Based on the foregoing, some of the goals of the present invention are as follows:

Allowing a limited number of back-to-back microprocessors writes with zero microprocessor wait states for operation of the microprocessor at a rate in excess of the current byte_clk rate.

Allowing an unlimited number of microprocessors writes with zero microprocessor wait states for operation of the microprocessor at a rate equal to or less than the current byte_clk rate.

Providing a ready line to throttle back microprocessor operation to a rate equal to the current byte_clk rate when microprocessor writes occur at a rate faster than the current byte_clk rate.

Supporting intermittent phase shifts of the byte_clk signal without effecting microprocessor writes.

Supporting microprocessors which do not have ready line capability by providing an interrupt when a microprocessor write rate overrun of a hard disc drive controller is about to occur, and providing a status bit indicating when such an overrun has occurred.

Providing a write in progress status bit indicating that microprocessor writes are being processed.

Providing a write in progress status bit indicating that writes are being processed, and using this bit for other system elements to further control a ready signal to a microprocessor such that a not ready indication is provided whenever a microprocessor write is being processed.

To achieve the above-mentioned goals, the present invention provides a disk controller coupled to a microprocessor, a host interface, a read/write channel. The disk controller includes a microprocessor interface, a byte clock domain, and a byte clock. A microprocessor interface is coupled to the microprocessor for communicating therewith. The byte clock domain is coupled to the microprocessor interface for synchronizing asynchronous writes of the microprocessor for synchronous operation with the read/write channel. The byte clock is coupled to the byte clock domain for providing a byte_clk signal to the byte clock domain, upon which the byte clock domain is synchronized.

The byte clock domain includes a write synchronization circuit which is coupled to the microprocessor interface. The write synchronization circuit receives the asynchronous writes of the microprocessor, and receives a byte_clk signal from the byte clock. The write synchronization circuit operates off the byte-clk signal for synchronizing the asynchronous writes of the microprocessor for synchronous operation with the read/write channel. The write synchronization circuit is coupled to formatter registers for providing data and address information obtained from the microprocessor writes. The address and data information is then transferred from the write synchronization circuit ultimately to the read/write channel in synchronous operation off of the byte_clk signal.

The write synchronization circuit includes a write control, a circular buffer, and a read control. The write control is coupled to the microprocessor for communicating the status of the write synchronization circuit. Thus, the microprocessor is informed as to whether the write synchronization circuit is about to overflow or has overflowed. Additionally, if the microprocessor has ready line capability, it is possible to operate with the insertion of wait states, or awaiting a ready status of the circuit prior to transmitting a subsequent microprocessor write. The circular buffer is coupled to the write control. The circular buffer receives the byte_clk signal and receives the information from the asynchronous microprocessor writes. The information is temporarily stored in the buffer. The circular buffer synchronizes the transfer of the information out of the buffer off the byte_clk signal. A read control is coupled to the circular buffer for transferring the information from the circular buffer to ones of formatter registers. The read control also receives the byte_clk signal such that the transfer of the information is synchronous to said signal.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Invention. In the drawing:

FIGS. 7A-7F lists example speed limitations for implementations using 80C196 and 80C52 microprocessors in accordance with one embodiment of the present invention.

FIGS. 11A and 11B is a schematic diagram of an implementation of a write control in accordance with the present invention.

Figure 1:
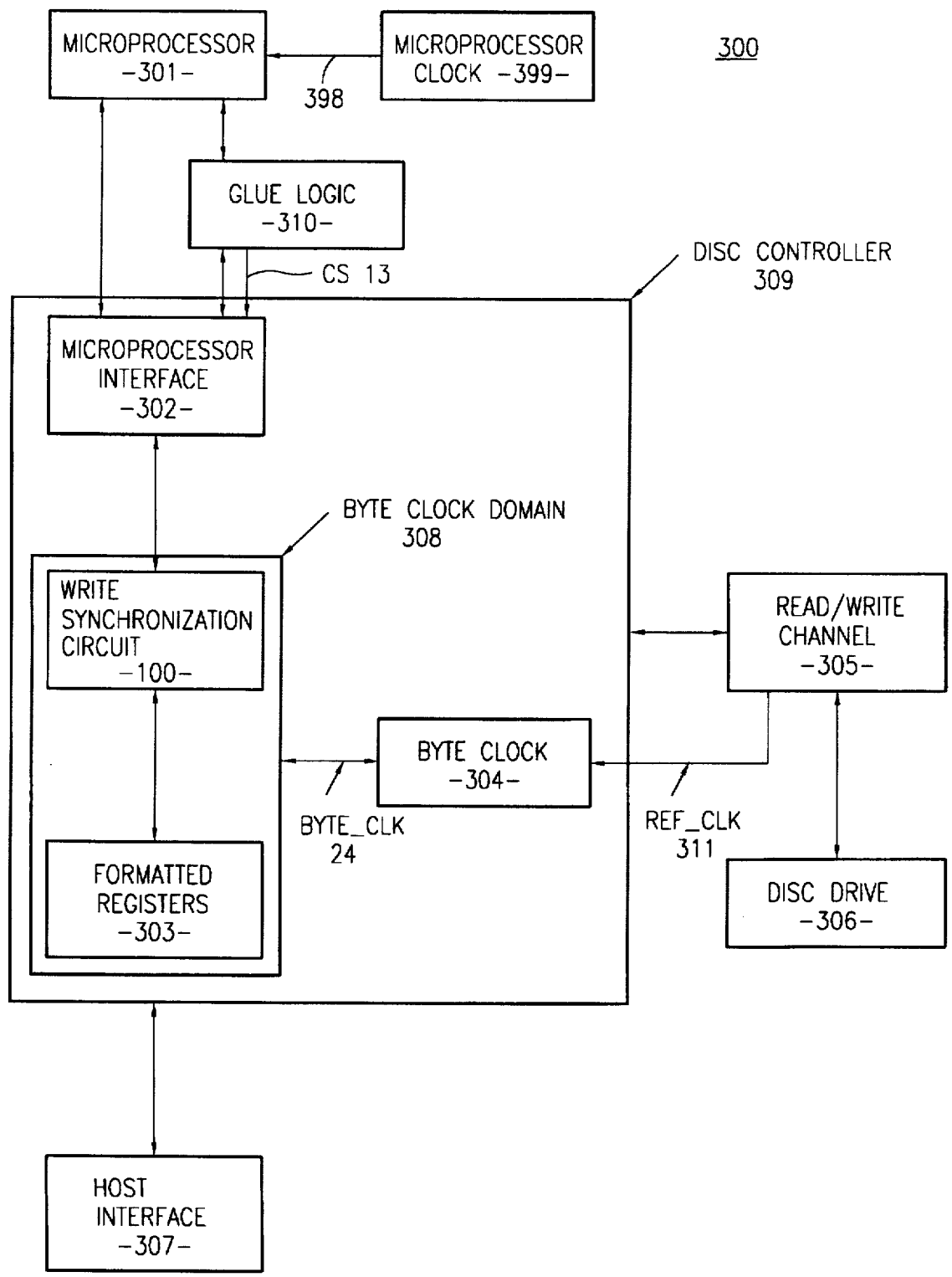
FIG. 1 is a block diagram illustrative of a system implementation of disc drive controller in accordance with the present invention.

Reference numbers refer to the same or equivalent parts of the present invention throughout the several figures of the drawing.

BEST MODE FOR CARRYING OUT THE PRESENT INVENTION

Referring to FIG. 1, there is shown a block diagram illustrative of a system 300 implementation of disc drive controller 309 in accordance with the present invention. Host interface 307 may be any computer interface, including but not limited to a SCSI (small computer system interface) and an AT (Advanced Technology) interface. Disc controller 309 may be implement as an ASIC (application specific integrated circuit). Moreover, glue logic 310 may be external to or incorporated in microprocessor 301.

In byte clock domain 308, write synchronization is achieved. Asynchronous microprocessor writes are provided from microprocessor 301 to microprocessor interface 302. Microprocessor interface 302 checks to see if addresses associated with microprocessor writes are within a predetermined address range of byte clock domain 308. Write synchronization circuit 100 captures those microprocessor writes within the predetermined address range into an address and data queue 25 (shown in FIG. 2). Microprocessor writes may then be sent from write synchronization circuit 100 to formatter registers 303.

Disc drive 306 and read/write channel 305 provide information and a reference clock (ref_clk) signal 311 to byte clock 304 of disc controller 309. Reference clock signal 311 may be divided down, depending on the type of code employed, by byte clock 304 to provide a byte clock (byte_clk) signal 24 to byte clock domain 308. If singe bit NRZ (non-return to zero) coded information is sent from read/write channel 305, then reference clock signal 311 is divided by eight; for two bit NRZ, reference clock signal 311 is divided by four; and for four bit NRZ, reference clock signal is divided by two.

Byte clock domain 308 is run synchronous (except for re-synchronization and asynchronous disc reset) to byte_clk signal 24. However, the phase of written data does not have to be synchronized. Data from disc controller 309 written to a disc of disc drive 306 has phase and frequency. The phase of the data written may be arbitrary, as the phase will be picked up when read, and the data read back will be synchronized to that phase.

It should be appreciated that the present invention facilitates the use of synthesis tools on VHDL code. As synthesis tools do not perform well when dealing with asynchronous clocks, write synchronization circuit 100 acts as a synchronizer. A buffer 20 (shown in FIG. 2) accommodates asynchronous microprocessor writes, while byte clock 304 provides a clean signal for synchronizing operation of byte clock domain 308, independent of microprocessor clock signal 398 from microprocessor clock 399. Moreover, where most synchronizers require microprocessor 301 bandwidth to be much smaller (typically on the order of one and a half times) than the bandwidth of the disc controller, the present invention allows microprocessor 302 and disc controller 309 bandwidth to be equal, and, if microprocessor 301 has ready logic, bandwidth of microprocessor 301 may exceed that of disc controller 309 for microprocessor write bursts for short periods of time. For a microprocessor 301 without ready logic, where the microprocessor clock rate is substantially faster than and ref_clk signal 311, byte clock domain 308 will accommodate write bursts from microprocessor 301 provided the sustained rate is less than or equal to the bandwidth of disc controller 309. However, in most operating environments microprocessor 301 will have to fetch one or more instructions between one or more microprocessor writes. Consequently, even in the presence of microprocessor writes at a burst rate, which ultimately would exceed the bandwidth of disc controller 309 if provided continuously, disc controller 309 bandwidth will not overflow owing to typical microprocessor operation, e.g., fetching instructions between writes.

Thus, the present invention optimizes both burst and average bandwidth throughput between microprocessor 301 and disc controller 309.

Figure 2:
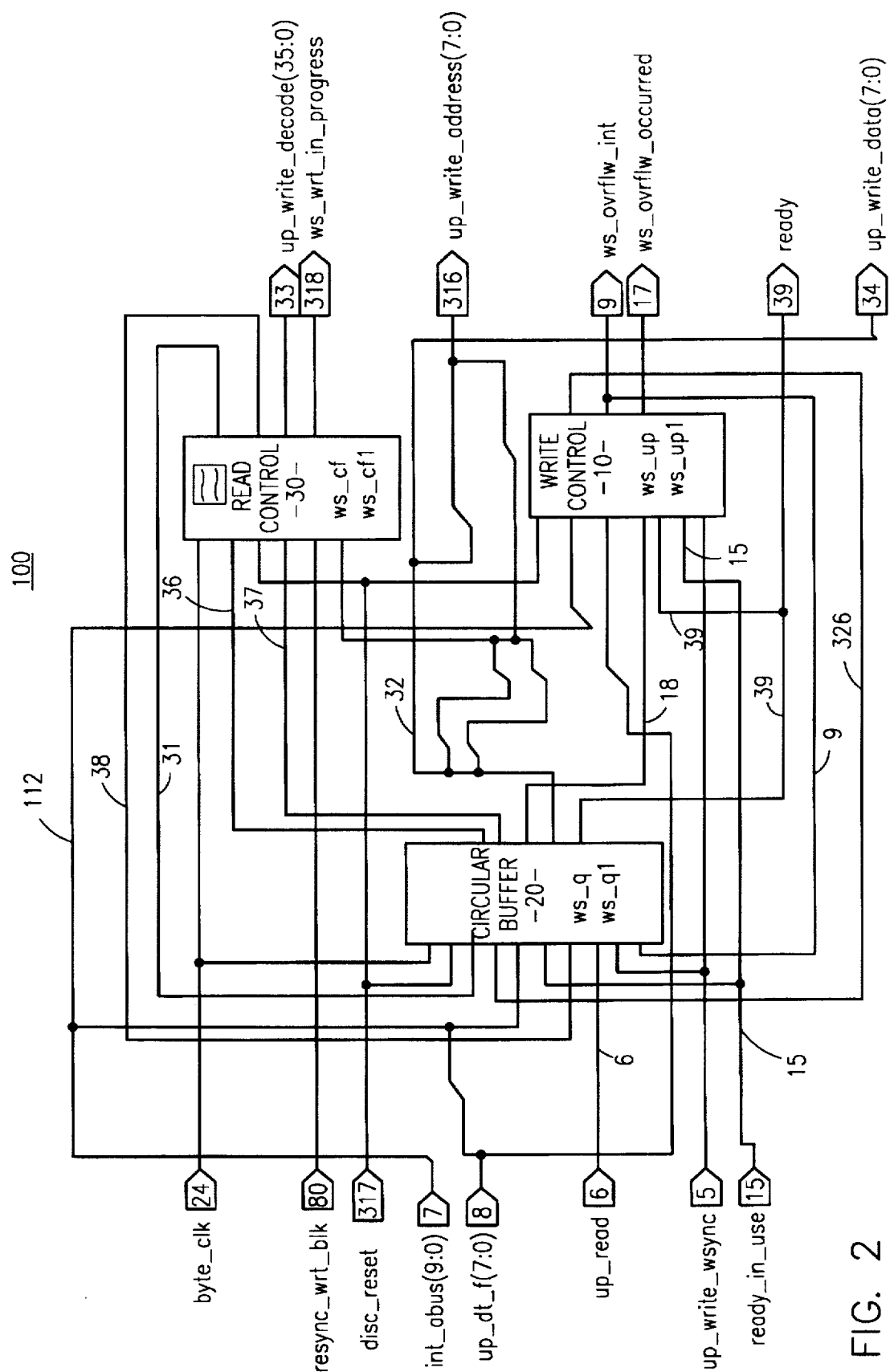
FIG. 2 is a layout diagram of microprocessor write synchronization circuit in accordance with the present invention.

Now, referring to FIG. 2, there is shown a layout diagram of microprocessor write synchronization circuit 100 in accordance with the present invention. Circuit 100 includes write control 10, circular buffer 20, and read control 30. Prior to discussing operation of circuit 100, a discussion of the operation of circular buffer 20 is warranted.

Figure 3:
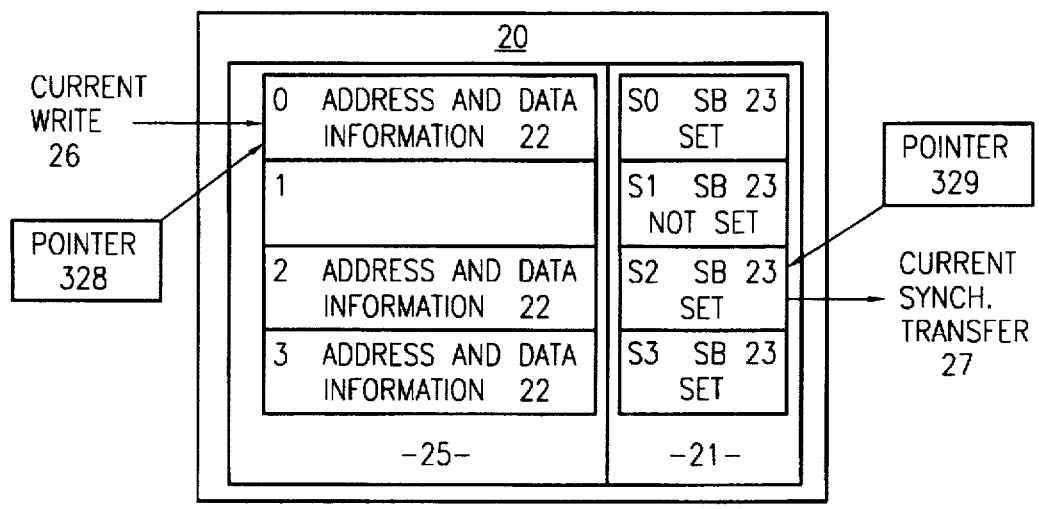
FIG. 3 is a block diagram illustrating a portion of circular buffer in accordance with the present invention.

In FIG. 3, there is shown a block diagram illustrating a portion of circular buffer 20 in accordance with the present invention. Circular buffer 20 is a four entry deep buffer. However, while a power of two number of entries tends to simplify circuit implementation, circular buffer 20 may be fewer or more entries than four deep. Data and address queue 25 includes storage elements 0 through 3. Corresponding service storage elements S0 through S3 comprise service queue 21. Consequently, there is a one to one correspondence between storage elements 0 through 3 and service storage elements S0 through S3. Storage elements 0 through 3, and service storage elements S0 through S3 may be any of a variety of read/write memory elements. However, service storage elements S0 through S3 must be capable of being asynchronously cleared. Even though service bits SB23 of storage elements S0 through S3 are cleared asynchronously, it will be appreciated that clear is performed synchronous to byte_clk signal 24. Each asynchronous clear occurs without affecting incoming microprocessor writes. Storage elements 0 through 3 may be either level or edge sensitive. However, having edge sensitive storage elements 0 through 3 will simplify design.

Varying types of data and address information 22 may be written to storage elements 0 through 3. If data and address information 22 is written to a storage element 0 through 3, then a corresponding service bit SB23 is set (e.g., service bit SB23 set equal to one) in a corresponding service storage element S0 through S3. As shown in FIG. 3, data and address information 22 has been written to storage elements 2 and 3. Consequently, a service bit SB23 has been set in each corresponding service storage element S2 and S3 as indicated by the SET notation.

Address and data information 22 is written into data and address queue 25 in a sequential manner. Thus, by way of example and not limitation, storage element 0 is the first to have information 22 written thereto, the next to have information 22 written thereto is storage element 1, and so on, until writing recycles to storage element 0. However, in accordance with one embodiment of the present invention, not only must the storage element (e.g., storage element 0) which is being written to with a current write 26 be available, but the subsequent storage element (e.g., storage element 1) must also be available. Thus, circular buffer 22 maintains at a minimum, a one entry gap between the storage element being written to (e.g., storage element 0 shown as having information 22 already written therein by a microprocessor write (e.g., current write 26) and the storage element having its information 22 synchronously transferred out (e.g., current synchronous transfer 27). The minimum one entry gap ensures no contention between circuitry operating synchronous to byte_clk signal 24 and circuitry receiving asynchronous microprocessor writes.

In FIG. 3, the fifth write (e.g., current write 26) is shown as having taken place, as well as the beginning of the third transfer (e.g., synchronous transfer 27) into byte_clk signal 24 (shown in FIG. 1) synchronous domain 308 (shown in FIG. 1). The first storage element 0 through 3 having address and data information 22 written thereto was storage element 0. It should be understood that storage element 0 has been previously cleared (made available) for accepting current write 26 address and data information 22. Thus, owing to the sequential nature of writing information to circular buffer 20, storage elements 0 and 1 have previously had address and data information 22 stored therein and subsequently cleared. As information 22 is written in a sequential manner to circular buffer 20, information is also removed from circular buffer 20 in a sequential manner. In other words, the first synchronous transfer was from storage element 0, the second synchronous transfer was from storage element 1, and the third synchronous transfer of information 22 is the current synchronous transfer 27. Therefore, circular buffer 20 operates on an ordered, sequential FIFO (first in, first out) principal.

Notably, when a microprocessor write takes place (e.g., current write 26), address and data information 22 is stored in a storage element 0 through 3 of queue 25 in buffer 20, and a service bit SB23 is set in a corresponding service storage element S0 through S3. Setting of service bit SB23 indicates that a write to buffer 20 needs servicing (synchronous transfer 27 out of buffer 20). As no address and data information 22 is in storage element 2 as shown in FIG. 2, service storage element S2 service bit SB23 is not set (e.g., service bit SB23 is set to zero), as indicated by the NOT SET notation.

Referring to FIGS. 1, 2, and 3 in combination, write control 10 is coupled to microprocessor 301 through microprocessor interface 302. For example, signals 5, 6, 7, and 8 are coupled to circuit 100 from microprocessor 301 through microprocessor interface 302. Microprocessor write (up_ write_wsync) signal 5 instructs circuit 100 that a microprocessor write is to take place. Microprocessor read (up_read) signal 6 instructs circuit 100 that a microprocessor read is to take place.

In the event of a microprocessor write, address and data information 22 to write is provided by microprocessor 301 to circuit 100. Signal int_abus 7 provides address information to circuit 100 from microprocessor 301. Signal up_dt_f 8 provides data information to circuit 100 from microprocessor 301. Signal 5 must be asserted ("true") for transferring information 22 from signals 7, 8 to buffer 20.

Figure 4:
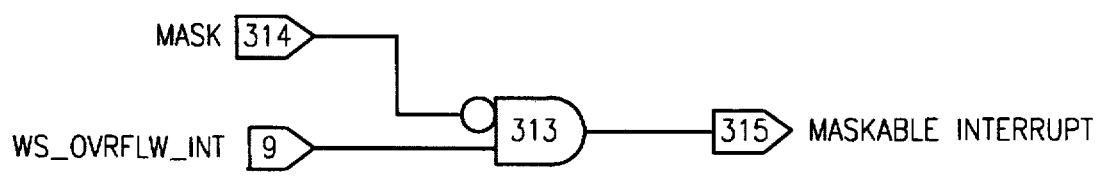
FIG. 4 is a schematic diagram illustrative of an embodiment of logic for providing a maskable interrupt in accordance with the present invention.

Interrupt control is provided from write control 10 by ws_ovrflw_int (write synchronization overflow interrupt) signal 9. When true, signal 9 sends an interrupt to microprocessor 301. Circuit 100 generates only one maskable interrupt bit, i.e., an interrupt which may be disabled prior to being received by the microprocessor. One implementation is shown in FIG. 4. In FIG. 4, there is shown a schematic diagram illustrative of logic for providing a maskable interrupt bit in accordance with the present invention. AND gate 313 receives ws_ovrflw_int signal 9 and mask signal 314 compliment as its inputs in order to provide a maskable interrupt signal 315. If mask signal 314 is asserted (true) when ws_ovrflw_int signal 9 is true, the interrupt is disabled prior to being received to microprocessor 301. Mask signal 314 is controlled via microprocessor 301 through microprocessor interface 302. A status bit is set true when an actual overflow occurs in buffer 20, and ws_ovrflw_occurred (write synchronization overflow occurred) signal 17 is asserted (true). The status bit of course may be maintained in a register, or other suitable means for storing a bit. Signal 17 bit is set in a register in microprocessor interface 302.

With continuing reference to FIGS. 1, 2, and 3 in combination, if ready line capability of microprocessor 301 is not used or not available, ws_ovrflw_int signal 9 is set true when, at trailing edge 43 (shown in FIG. 5) of up_write_wsync signal 5, a location to be written to has a service queue bit SB23 two locations ahead of the current write location which is not available (SET) (e.g., as shown in FIG. 3 with respect to current write 26 to storage element 0, two locations ahead, at storage element 2, service bit SB23 is SET). Buffer 20 provides overflow_in_1 signal 18 to write control 10 to indicate that an overflow is imminent. In other words, ws_ovrflw_int signal 9 is pulled true one location away from an overflow, as only one storage element 0 through 3 will be available at the end of the current write. In which case, ws_ovrflw_int signal 9 is provided to microprocessor interface 302. The interrupt is cleared by a up_write_wsync signal 5 to a specified location. Circuit 100 clears its interrupt by reading a predetermined address (see VHDL listing regarding disc_int_addr mentioned elsewhere herein).

If microprocessor 301 ignores signal 9 and provides a subsequent write to circuit 100 prior to clearing the interrupt, then the overflow status bit is set, and ws_ovrflw_occurred signal 17 is asserted (set true).

When ready_in_use signal 15 is not true, microprocessor 301, operating at a sufficiently fast speed coupled with multiple back-to-back writes, may cause overflow conditions. To avoid overflows to buffer 20 (shown in FIG. 1), speed limitations may be imposed on microprocessor 301. FIGS. 7A–7F lists example speed limitations for implementations using 80C196 and 80C52 microprocessors in accordance with the present invention.

When microprocessor 301 can accommodate an optional ready line, and thus ready_in_use signal 15 is true, ready signal 39 is assertable by write control 10, and may be employed for either of two modes of operation. A configuration register bit in microprocessor interface 302 is employed for selecting which mode of operation is employed. If microprocessor 301 is operating in a ready control mode for inserting wait states (i.e., inserting wait states as long as ready signal 39 is true), ready signal 39 may be used to cause microprocessor 301 to insert wait states only when necessary to prevent buffer 20 overflow. Alternatively, for in order operation mode, ready signal 39 may be used to cause microprocessor 301 to insert wait states on each microprocessor write which is close in time to a previous microprocessor write. This latter mode of operation guarantees that each microprocessor write will progress through the synchronous portion of read control 30 of circuit 100 into an intended formatter register of formatter registers 303. In this latter mode, a microprocessor write will be forced to completion prior to a subsequent write to buffer 20, i.e., prior to assertion of a next up_write_sync signal 5.

When ready_in_use signal 15 is active, an interrupt (i.e., assertion of ws_ovrflw_int signal 9) will be sent if microprocessor 301 ignores assertion of ready signal 39. If ready_in_use signal 15 is true, and if ready signal 39 and ws_ovrflw_int signal 9 are both ignored by microprocessor 301, ws_ovrflw_occurred signal 17 will be asserted and the overflow status bit will be set.

In either mode, it may not be possible to tie ready directly to the microprocessor input ready line. The timing required, as to when ready signal 39 is to be deasserted (i.e., when wait states no longer need to be inserted) may be too strict to allow a chip select signal 13 to gate ready signal 39. Also, other sources for providing a ready line input to microprocessor 301 may need to be gated together with ready signal 39. The ready signal may also be configured as an open collector/drain signal for wire "ORing" (wired OR function). As is known, open collector type devices can share a same signal line. Ready signal 39 is deasserted at the end of a current write cycle, if the next write to formatter 303 requires insertion of wait states. This allows glue logic 310 to sample ready signal 39 very early in a subsequent write cycle to determine if no wait states are required. Notably, ready signal 39 will be driven true whenever up_read signal 6 is true.

Figure 6:
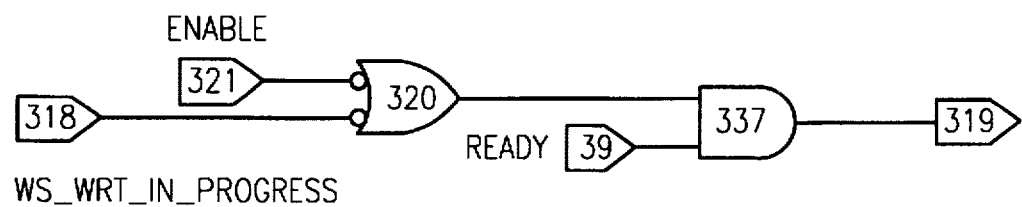
FIG. 6 is a schematic diagram illustrative of an embodiment of logic for providing a gated ready signal in accordance with the present invention.

Ready signal 39 may be gated with ws_wrt_in_progress (write synchronization write in progress) signal 318. FIG. 6 is a schematic diagram illustrative of logic for providing a gated read signal 39 in accordance with the present invention. For example, in FIG. 6, OR gate 320 has two inputs which are inverted (complimented), namely, ws_wrt_in_progress 318 and enable 321. Enable signal 321 may be provided via microprocessor 301 through microprocessor interface 302.

When enable 321 is asserted, OR gate 320 output will gate ready signal 39 via AND gate 337. For example, when enable is not asserted (e.g., zero), output of OR gate 320 will always be true (e.g., one). However, when enable is asserted, output of OR gate 320 will only be true when ws_wrt_in_progress signal 318 is not asserted. Thus, if a write is still in progress, output of OR gate 320 is low, and output 319 of AND gate 337 is low even when ready signal 39 is asserted. Output 319 is coupled to microprocessor 301 for ready control or in order operation mode.

Figure 5:
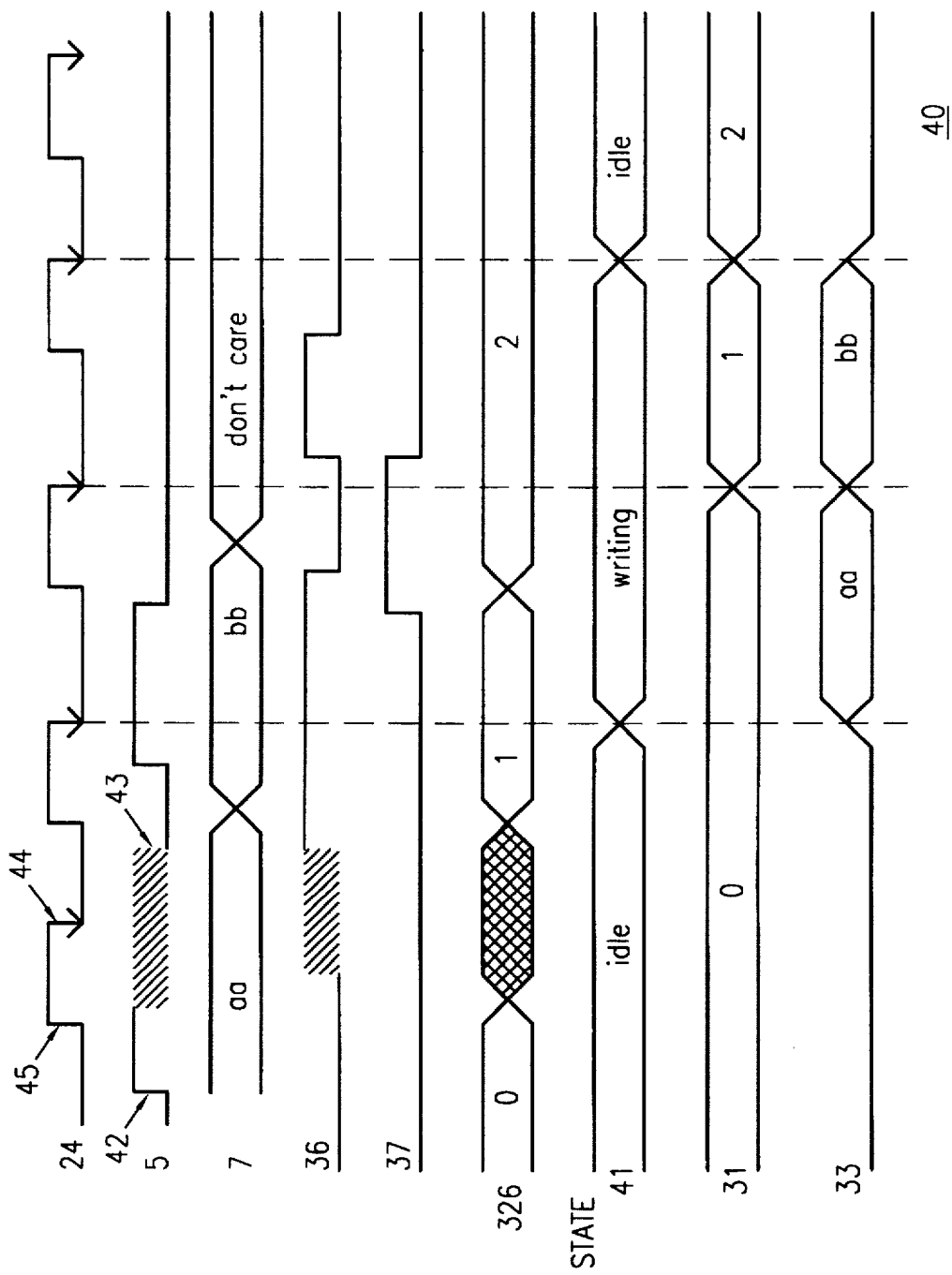
FIG. 5 is a timing diagram in accordance with the present invention.

In FIG. 5, there is shown timing diagram 40 in accordance with the present invention. In the timing diagram of FIG. 5, it should be understood that no re-synchronization of byte_clk 24 is occurring. In the timing diagram, all signals are positive logic. With renewed reference to FIGS. 1, 2, 3, and 5 in combination on disc reset signal 317, service queue bits SB23 are set to zero (0) (i.e., NOT SET). A subsequent write then causes the setting of a service bit SB23 in a service storage element S0 through S3 of service queue 21. This implies that there is data at the corresponding address in queue 25 that has not been written into a formatter register of formatter registers 303. On leading edge 42 of up_write_wsync signal 5, write control 10 checks signal 9 from buffer 20. If signal 9 is true, an internal flag for overflow imminent is set in microprocessor interface 302. Leading edge 42 is used to provide metastable time, as bit SB23 is cleared asynchronously by read control 30, and on trailing edge 43 of up_write_wsync signal 5. If ws_ovrflw_occurred 17 is not true, information from signal 7 and signal 8 is written into a storage element 0 through 3 of queue 25 and a corresponding service queue bit SB23 is set. Signal q_write_addr 326 (shown in FIG. 2) is incremented by write control 10, if no overflow occurred with the previous write, in order to be ready for the next write to a storage element 0 through 3. Read control 30 continuously samples current_service signal 36 and next_service signal 37 bits on rising edge 45 of byte_clk signal 24. Current_service signal 36 is the service bit SB23 pointed to by pointer 329. Next_service signal 37 is the following service bit SB23. This sampling provides one half of a cycle of byte_clk signal 24 for metastable settling time.

On leading edge 42 of signal 5, circular buffer 20 samples a service bit SB23 two locations ahead of a current write address to storage elements 0 through 3 to determine if any previous write to that location has been serviced (cleared). Pointer 329 is q_write_addr 326 (shown in FIG. 2) and is used for this sampling. As indicated elsewhere herein, if service bit SB23 is NOT SET, it indicates that the previous write, if any, has been cleared. However, information 22 may actually still be in the storage element 0 through 3 corresponding the sampled service bit SB23 even though a NOT SET indication is found. The current_service signal 36 is set on falling edge 43 of signal 5. Pointer 329 is latched to the location of the service bit SB23, if SB23 is set. Pointer 329 to the service bit SB23 location is used as a signal to control ready signal 39.

Using leading edge 42 to sample service bit SB23 followed by using falling edge 43 to select service bit SB23 provides for an anti-metastable decay time in case byte_clk signal 24 synchronous read control 30 circuitry is clearing service bit SB23 at relatively the same moment that that same service bit SB23 is being sampled. A 25 nanosecond (ns) pulsewidth provides a large calculated metastable mean time between failures (MTBF) with 0.6 micron ASIC technology.

Figure 8:
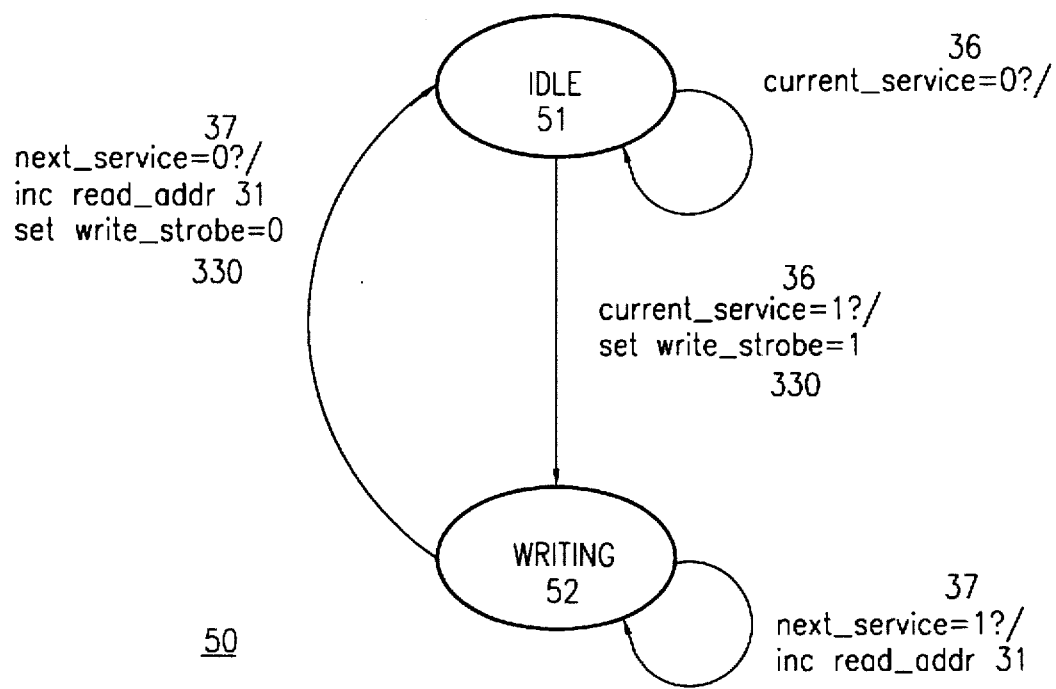
FIG. 8 is a state diagram for a state machine in accordance with the present invention.

In FIG. 8, there is shown a state diagram for state machine 50 in accordance with the present invention. Referring to FIGS. 1 through 3, 5, and 8 in combination, state machine 50 is run on falling edge 44 of byte_clk signal 24. State machine 50 has two states, namely, idle 51 and writing 52. State machine 50 stays in idle state 51 as long as current_service signal 36 bit is not true (0). This means that there is no information 22 in queue 25 which needs transferring. If current_service signal 36 bit is true (1), write_strobe signal bit 330 is set to equal 1, and state machine 50 goes from idle state 51 to writing state 52. In other words, there is information 22 in queue 25 which needs to be transferred out of buffer 20. State machine 50 stays in state 52 as long as next_service signal 37 bit equals 1. In which case, q_read_addr signal 31 bit is incremented for the next storage element 0 through 3 to be read, and read_data signal 32 is true for reading information 22 from buffer 20. If, however, next_service signal 37 bit is set to 0, state machine goes from writing state 52 to idle state 51. Notably, as long as there is a service bit SB23 set in service queue 21, read control 30 will continue to perform writes into formatter registers 303 on each successive byte_clk signal 24 cycle. During each write into the formatter, a corresponding service queue bit SB23 is asynchronously cleared by service_clr signal 38.

Figure 10A:
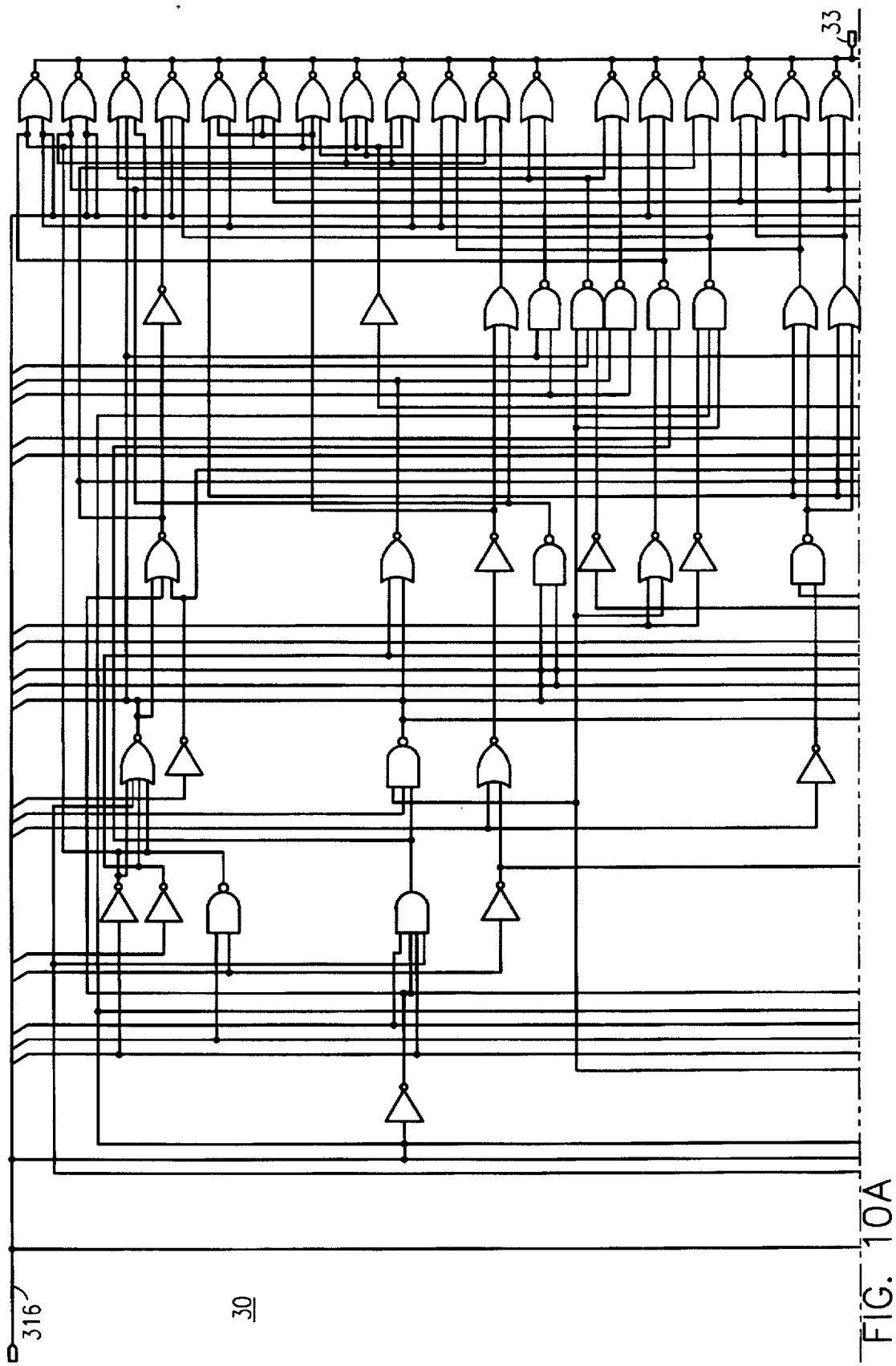
FIGS. 10A-10D are schematic diagrams of an implementation of a read control in accordance with the present invention.
Figure 10B:
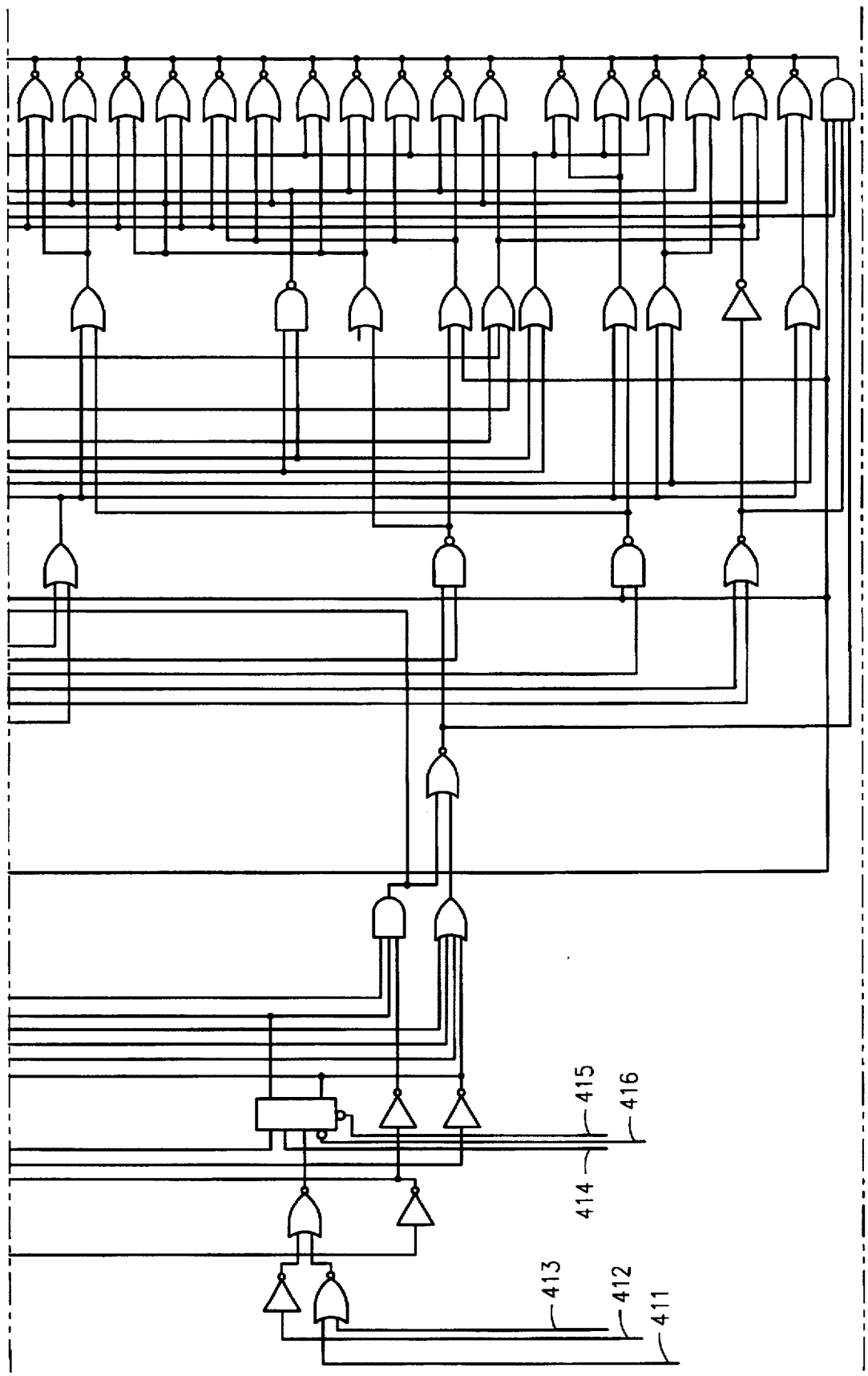
Figure 10C:
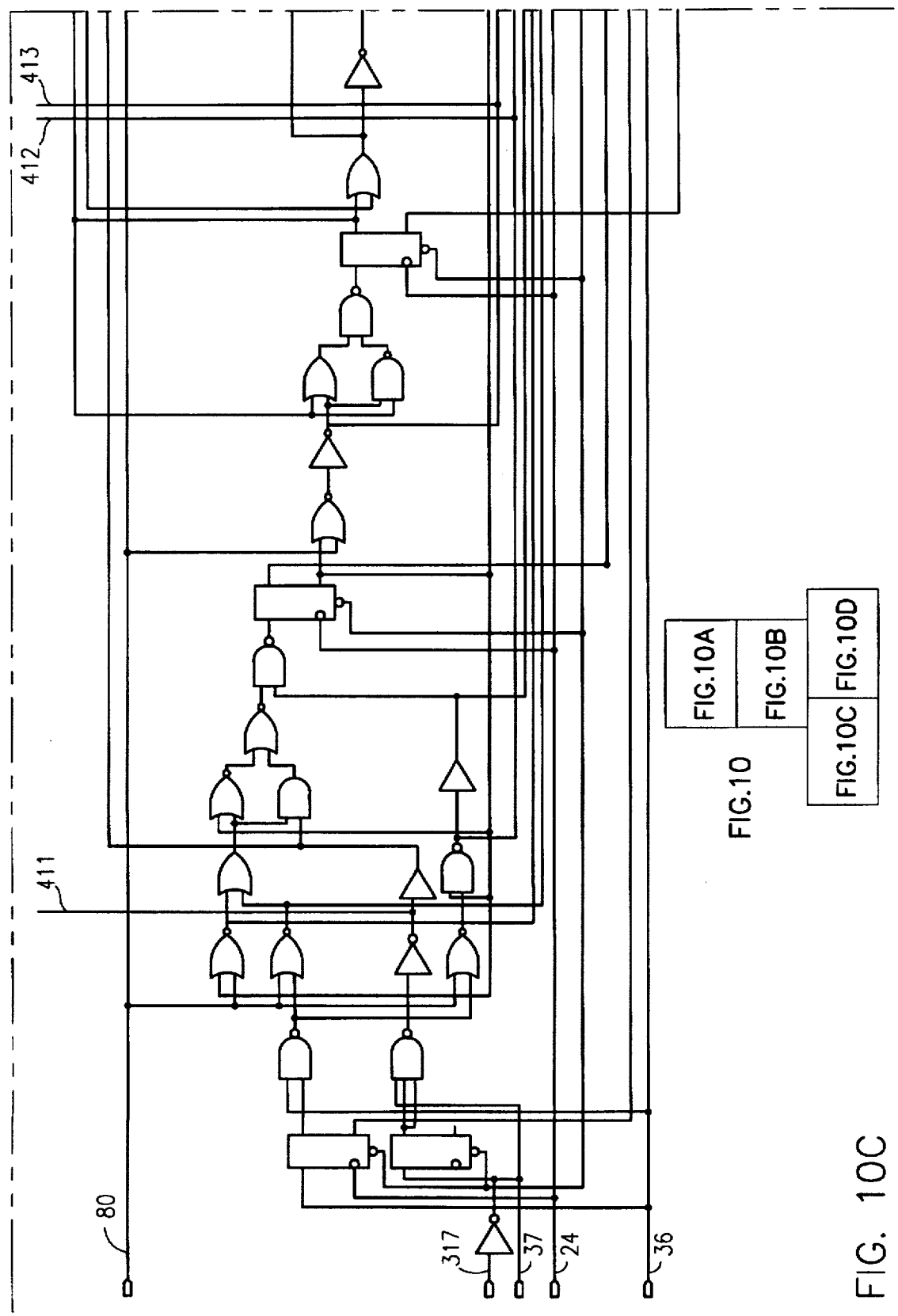
Figure 10D:
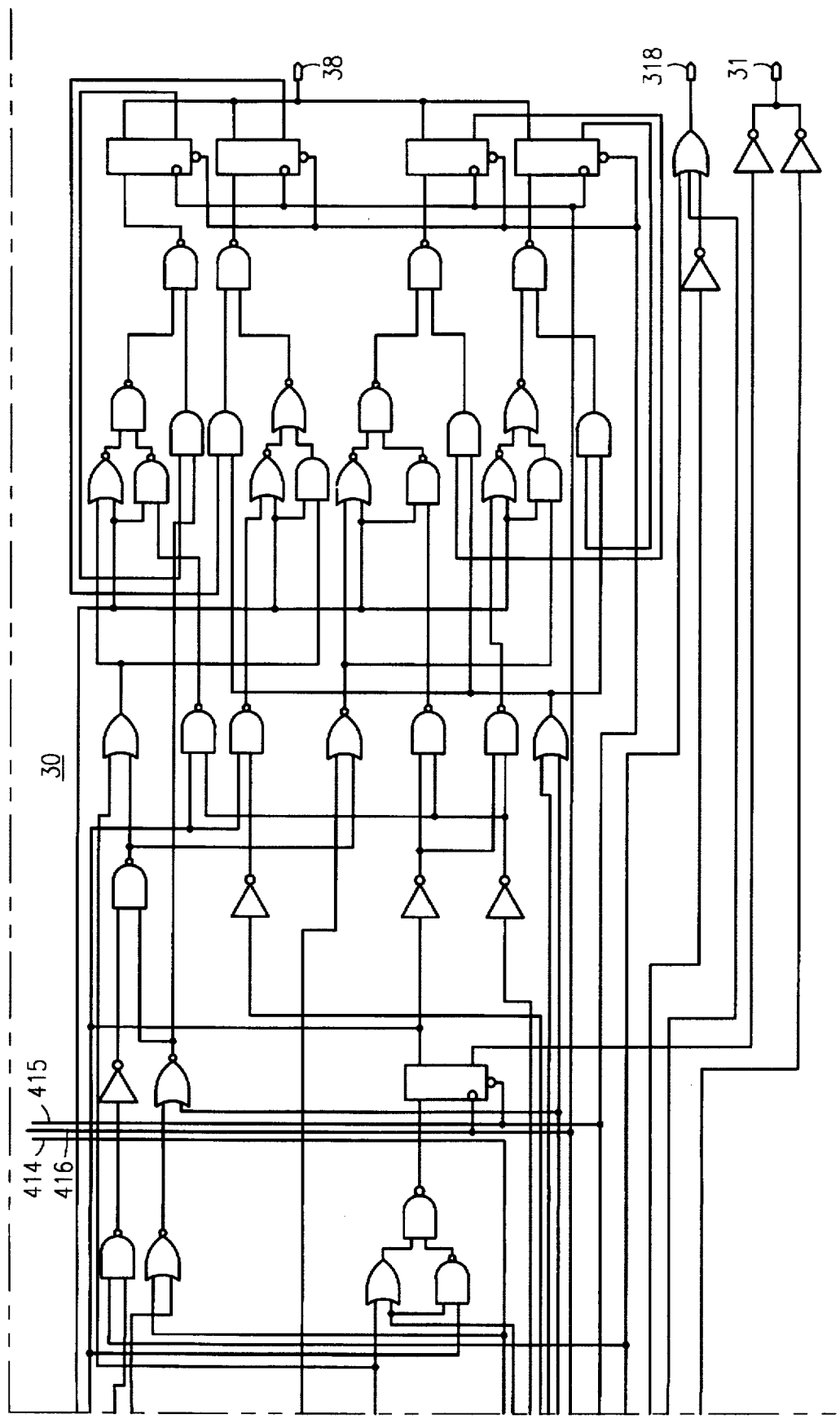
Figure 11A:
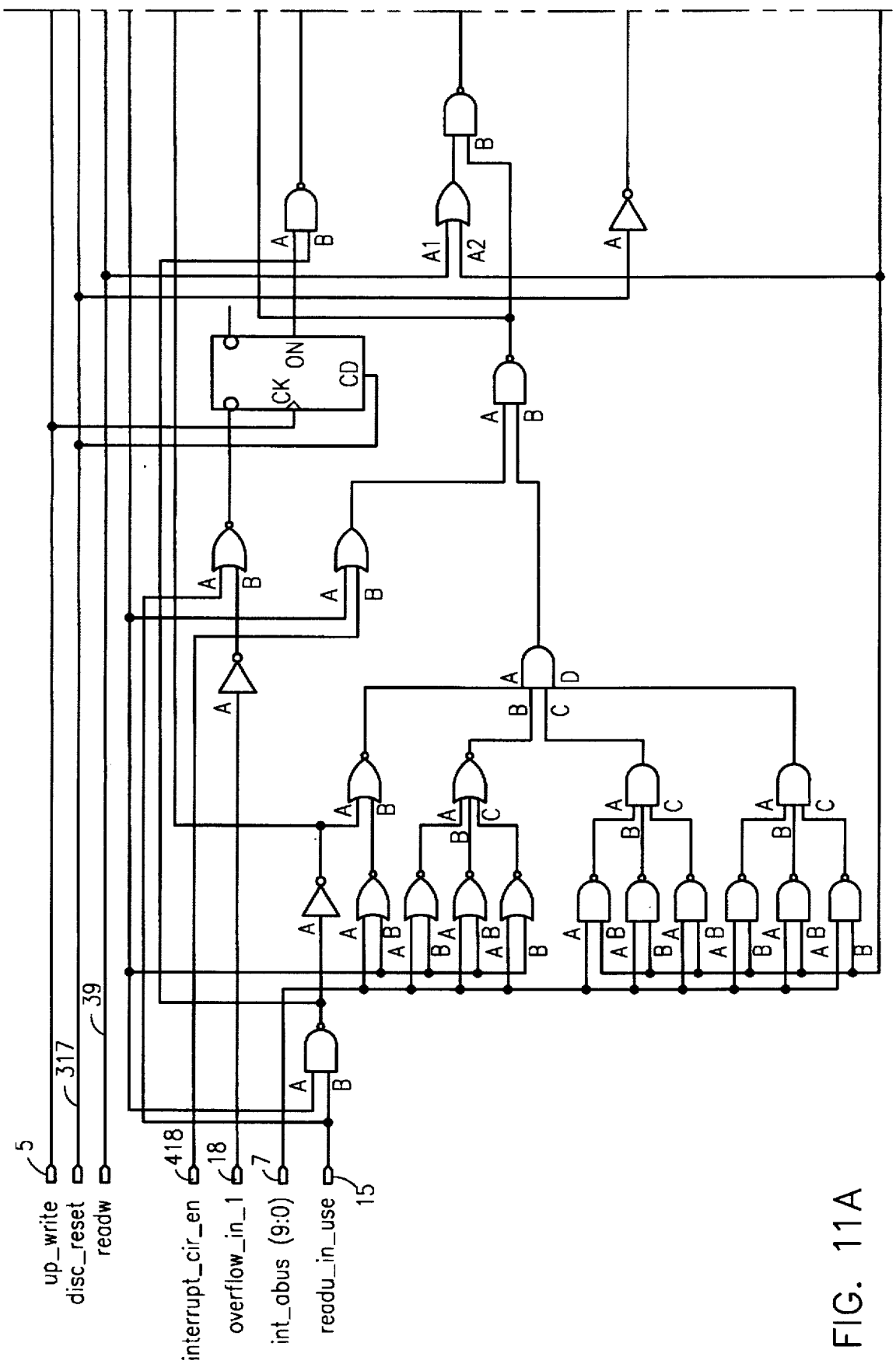
Figure 12:
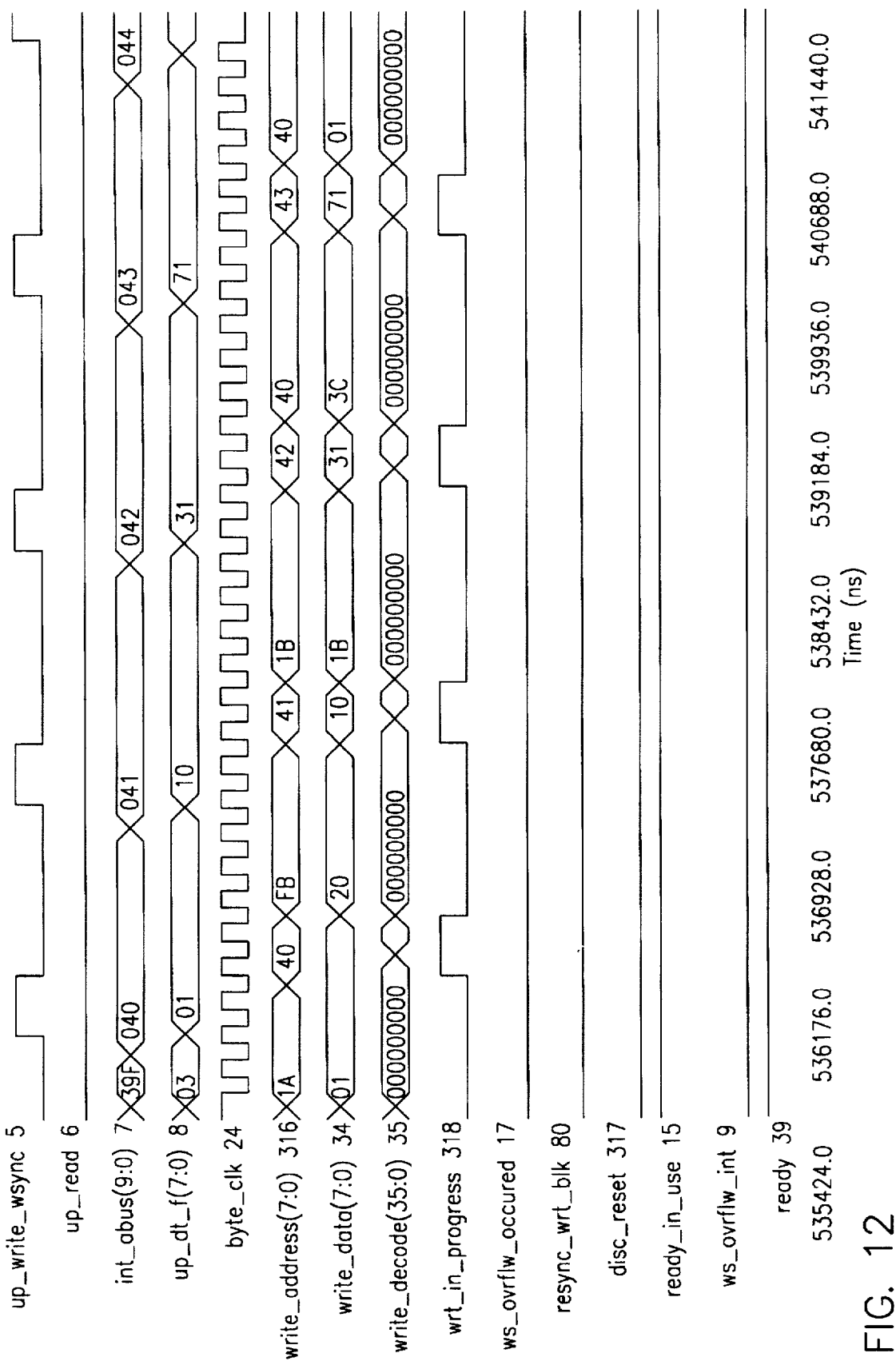
FIGS. 12 and 13 are timing diagrams in accordance with the present invention.

To prevent q_read_addr 31 decode glitches from asynchronously clearing a service queue bit SB23 prior to transfer of information 22 out of a subsequent storage element 0 through 3, signal 31 is used to look ahead to determine which service bit SB23 is to be cleared. The next read_addr signal 31 is read to determine which service bit SB23 is to be cleared. A separate latch 4 (shown in FIG. 10A) is employed for each service queue bit to guarantee a glitchless clear signal for each service queue bit. For example, with reference to FIG. 3, this ensures completion of transfer 27 prior to mistakenly clearing service bit SB23 of service storage element S2.

Therefore, read control 30 circuitry for controlling transferring information 22 out of buffer 20 synchronous to byte_clk signal 24 has two modes of operation, namely, idle and writing (transferring). Circuit 100 goes idle when all service bits SB23 are cleared. This only happens when disc_reset 317 is true or when transfer pointer 329 catches up to microprocessor write pointer 328. Write pointer 329 is write address (write_addr) signal 326. Thus, whenever at idle, write pointer 328 and transfer pointer 329 are pointing at the same entry in buffer 20. When in idle, transfer circuitry of read control 30 continuously samples the service bit SB23 pointed to by transfer pointer 329 using the inactive edge (e.g., leading edge 45) of byte_clk signal 24. When the sampled service bit SB23 is SET, circuit 100 transitions into the transferring state on the active edge (e.g., falling edge 44) of byte_clk signal 24. Using the inactive edge to sample service bit SB23 provides for a very large anti-metastable to decay time. The circuit also continuously samples the next service bit SB23 (e.g., next_service signal 37) following the current service bit SB23 (e.g., current_service signal 36) with the inactive edge of byte_clk signal 24. This next sampled bit SB23 is used in the transferring state to determine if transferring should continue or read control 30 should be returned to idle. By sampling ahead on service bits SB23, synchronization latency is only paid on the first write. For all subsequent writes, synchronization occurs concurrent with the previous write being transferred into the synchronous section (e.g., read control 30) of circuit 100. Using this feature, circuit 100 is able to transfer a buffer 20 entry into the synchronous read control 30 portion of circuit 100 on each byte_clk signal 24 half cycle and throughput bandwidth is optimized.

Circuit 100 clears service bit SB23 on the active edge of the byte_clk signal 24, but it also changes transfer pointer 329 into buffer 20 on this edge. Circuit 100 looks ahead and sets the service clear (service_clr) signal 38 bit for the location that it is actively transferring. This means that a storage service bit SB23 in service storage element S0 through S3 is actually cleared before data has actually been transferred out of a corresponding storage element 0 through 3 in buffer 20. Thus, ready logic in the microprocessor write section (e.g., write control 10) of circuit 100 samples service bits SB23 two locations ahead rather than one.

In other words, if service storage element S0 had a NOT SET indication and service storage element S1 had a SET indication, service storage element S0 may not actually be available. However, by requiring the subsequent storage element (e.g., S1 in the above example) to have a NOT SET indication, it is ensured that the previous storage element (e.g., S0 in the above example) is available. Thus, a one service storage element entry gap is maintained.

Figure 9:
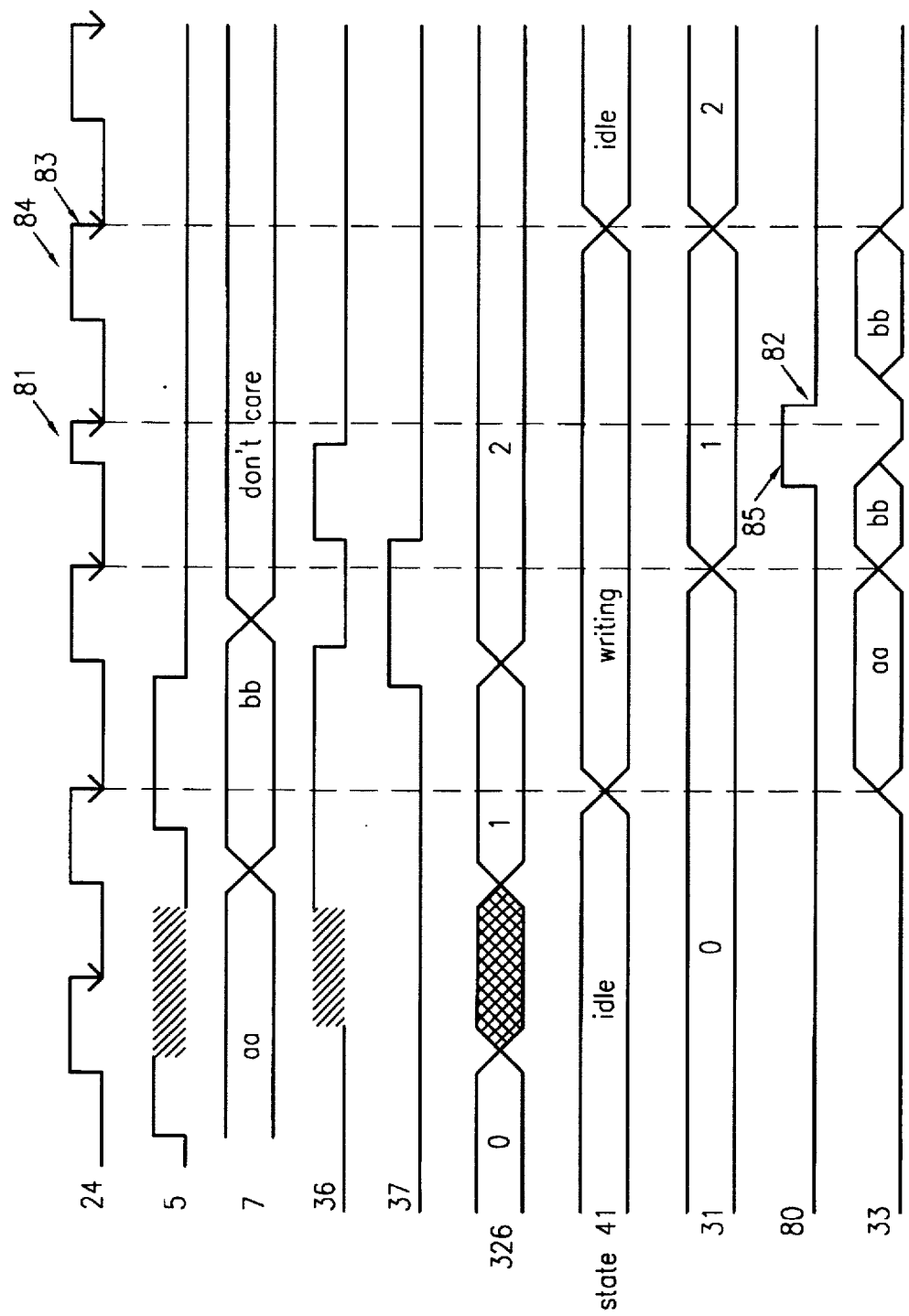
FIG. 9 is a timing diagram for re-synchronization of a byte_clk signal in accordance with the present invention.

Referring to FIG. 9, there is shown a timing diagram for re-synchronization of byte_clk signal 24. All signals shown in FIG. 9 are positive logic. With reference to FIGS. 2 and 9, if a re-synchronization of byte_clk signal 24 occurs, as indicated by shortened pulse 81, while read control 30 is performing a write, read control 30 will use resync_wrt_blk 80 to gate off up_write_decode signal 33 approximately two bit times (e.g., two bit times minus a few nanoseconds) minimum time before falling edge 82. Read control 30 will extend the current write until the falling edge 83 of the subsequent byte_clk signal 24 pulse 84.

Again referring to FIG. 1, circuit 100 receives an advance signal from byte clock section 304 which informs circuit 100 that a short byte_clk 24 pulse 81 is about to occur. Circuit 100 receives the advance signal (resync_wrt_blk 80) approximately two bit times, as a minimum, before the re-synchronization occurs.

Referring to FIGS. 10A–10D, 11A and 11B, and 12, there are shown schematic diagrams of an implementation of read control 30, write control 10 and circular buffer 20, respectively, in accordance with the present invention.

Figure 13:
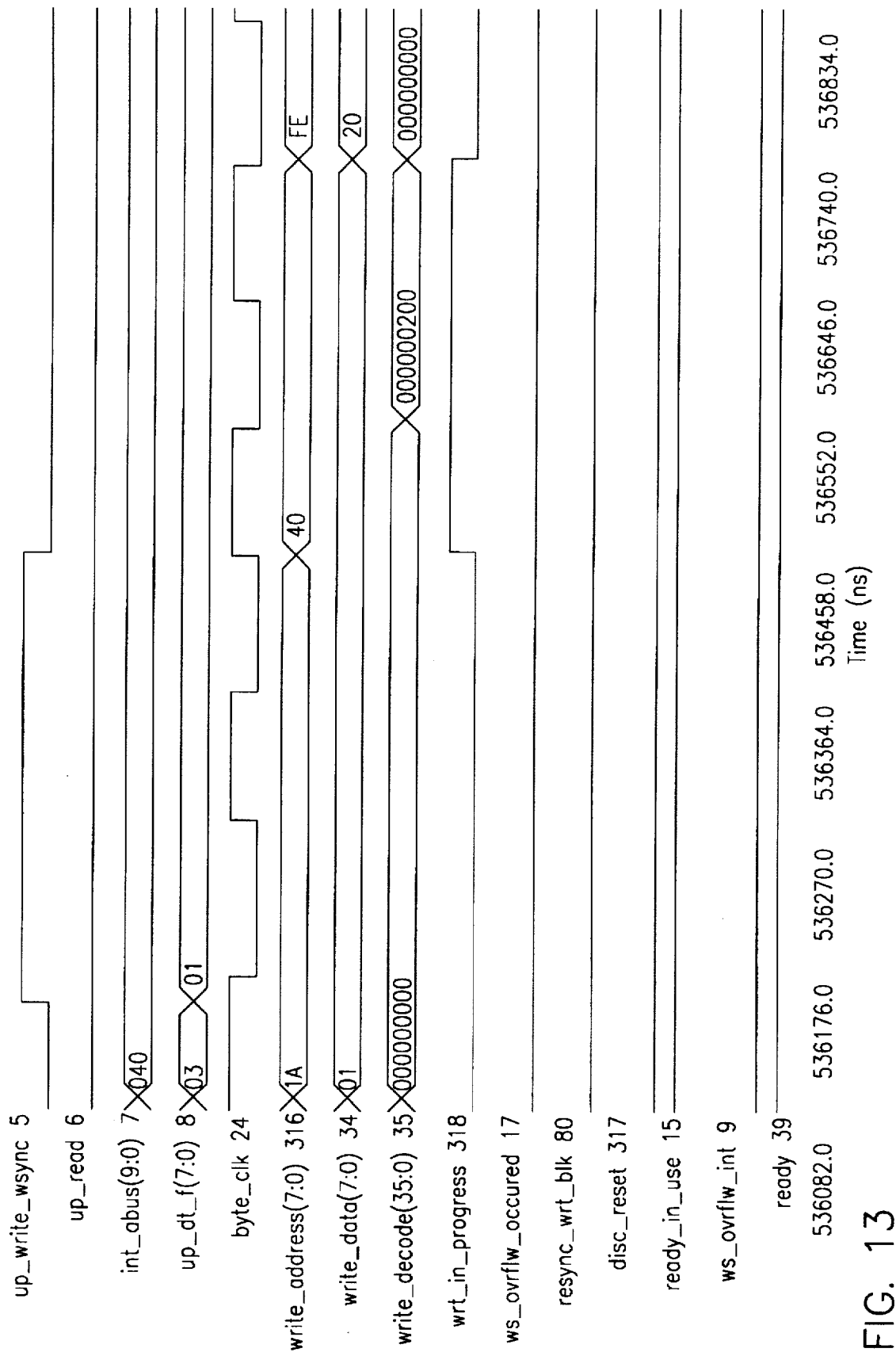

Referring to FIG. 13, there are shown timing diagrams in accordance with the present invention. In FIG. 13, time is expressed in nanoseconds (ns).

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

What is claimed is:

1. Apparatus comprising:

a hard disc drive including disc media for storing data;

a disc controller connected for controlling said hard disc drive;

a clock connected for running said disc controller, said clock running at a relatively slow variable rate;

a microprocessor connected for providing writes into said disc controller, said microprocessor having a maximum operating rate higher than the rate of said clock; and an interface circuit for interfacing said microprocessor to said disc controller, said interface circuit employing a circular buffer having a plurality of elements to be written to, said circular buffer maintaining a one entry gap between ones of said elements which are being written to by said microprocessor and those of said elements which are being operated on by said clock;

whereby said interface circuit allows a limited number of back-to-back writes of said microprocessor with zero wait states of said microprocessor at the maximum rate of said microprocessor;

whereby said interface circuit allows an unlimited number of writes of said microprocessor with zero wait states of said microprocessor at a rate equal to or less than the rate of said clock;

whereby said interface circuit provides a ready line to throttle back the writes of said microprocessor to a rate equal to the current rate, if the writes of said microprocessor occur at a rate faster than said clock.

* * * * *